Figure 1:
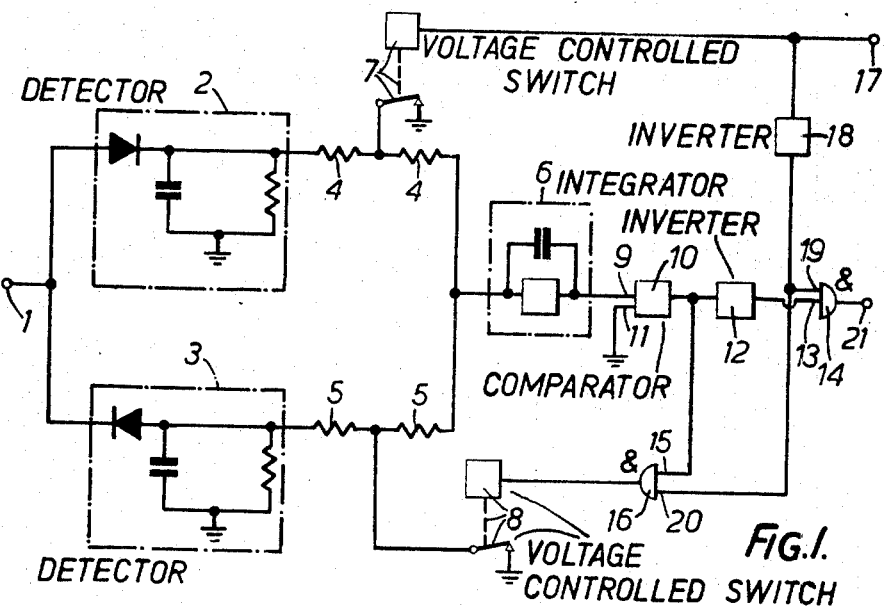

United States Patent [19]

O'Neill

[11] 3,710,253
[45] Jan. 9, 1973

[54] PERFORMANCE CHECKING AND MEASURING DEVICES AND METHODS FOR SIGNAL CHANNELS

[75] Inventor: Damer Evelyn O'Neill, Waddington, St. Albans, England

[73] Assignee: Marconi Instruments Limited, London, England

[22] Filed: March 29, 1971

[21] Appl. No.: 128,680

[52] U.S. Cl..............324/140 D, 178/69 A, 328/161
[51] Int. Cl. ..............................................G01r 7/00
[58] Field of Search .............324/140; 328/161, 163; 235/196; 178/69

[56] References Cited

UNITED STATES PATENTS 3,502,983   3/1970   Ingle et al. ..................324/140 D Primary Examiner—Alfred E. Smith
Attorney—Baldwin, Wight & Brown

[57] ABSTRACT

A method of measuring the peak to average value of an A.C. signal includes a peak value detector, an average value detector and a timing waveform source. During alternate half-waves of the timing waveform output from one of the detectors is integrated and during the other half-wave, output from the other detector is integrated, the lengths of the periods for which each detector output is integrated being a function of the two integrated voltages. An output pulsed waveform is produced, the average value of which is representative of the relation between the integrating periods and the duration of a half-wave of the timing waveform.

8 Claims, 6 Drawing Figures

PATENTED JAN 9 1973 3,710,253

Inventor:
Damer Evelyn O'Neill Waddington
BY Baldwin Wight & Brown
Attorneys

PERFORMANCE CHECKING AND MEASURING DEVICES AND METHODS FOR SIGNAL CHANNELS

This invention relates to performance checking and measuring devices and methods for signal channels and has for its object to provide improved devices and methods for checking or measuring the ratio of the peak to the average value of an alternating current signal in a signal channel such, for example, as a telephone line used for data transmission.

In a well known method of testing a telephone line used for data transmission and similar purposes a signal having a specified frequency/phase spectrum is transmitted over the line the quality or performance of which is determined by measuring, at the output end of the line, the ratio of the peak signal to the average signal in order to determine the peak to average rating (P.A.R.). This rating is given by the Equation:

PAR =[2 (Peak/average ratio at line output)/(Peak/average ratio at line input) − 1 ] 100

If the system constants are known this can be simplified to:

PAR =[(2$KV_p$/$Va$) − 1] 100 where
$V_p$ is the peak value at line output
$V_a$ is the Full wave average value at line output
$K$ is the system constant.

Normal present day practice is to adjust the signal amplitude (before detection) at the line output to make $V_a$ equal to unity so that:

PAR = (2$KV_p$ − $V_a$) 100

This practice has the serious defect that it depends, for accuracy, upon the accuracy of the adjustment of $V_a$ to unity, any inaccuracy in this adjustment critically affecting the accuracy of the final measurement. The present invention seeks to avoid this disadvantage.

According to this invention in its broadest aspect a method of measuring the ratio of the peak value to the average value of an alternating current signal includes the steps of transforming the said peak and average values into time periods and producing a waveform representative of the relation between said time periods.

According to a feature of the invention a method of measuring the ratio of the peak value to the average value of an alternating current signal includes deriving from said signal voltages respectively representative of the peak and average values of said signal, integrating one of said voltages over alternative half waves of a periodic timing waveform, integrating the other of said voltages during periods which alternate with said half waves and are of lengths determined by the relation between the two integrated derived voltages, and producing an output pulsed waveform the average value of which is representative of the relation between the lengths of said periods and the duration of a half-wave of the timing wave form.

Preferably the two derived voltages are applied in turn to a common integrator, the switching of one of said voltages being controlled by the timing wave form so that said voltage is fed to said integrator for alternate half waves of the timing wave form, and the switching of the other of said voltages being jointly controlled by said timing wave form and a comparator connected to receive output from the integrator.

Preferably also the output pulsed wave form is a wave form of modulated pulse width produced under joint control by the timing wave form and the output from the comparator.

According to another feature of this invention a device for measuring the ratio of the peak value to the average value of an alternating current signal comprises a peak value detector and an average value detector fed with said signal; a timing wave form source; means for integrating output from one of the detectors during alternate half-waves of the timing wave form; means for integrating output from the other of said detectors during periods which alternate with said half waves and are of lengths determined by the relation between the outputs from the detectors; and means for deriving from the timing wave form a pulsed output wave form of pulse width modulated in dependence upon the relation between said periods and the length of a half-wave of the timing wave form.

Preferably the outputs from the detectors are integrated by a common integrator to which said outputs are fed in turn under the control of switching means.

Preferably the output from the common integrator is fed to one input of a comparator the other input of which is earthed, said comparator being adapted to reverse its output and become zero when the integrated input thereto becomes zero; the timing wave form is applied to control a first switch to cause the output from the peak detector to be applied to the common integrator during alternate half-waves from the timing wave form source; and there are provided two gate circuit devices both jointly controlled by output derived from the comparator and by a wave form derived from the timing wave form source, one of said gate circuit devices providing an output controlling a second switch to cause output from the average detector to be applied to the integrator for a time each of which commences at the end of one of said alternate half-waves of the timing wave form and terminates when the aforesaid input to the integrator next reaches zero and the other of which provides a pulsed output wave form each pulse in which commences at a time of termination of the application of output from the average detector to the integrator and terminates at the time of commencement of the next following half-wave of the timing wave form.

A preferred embodiment of the invention comprises a peak detector and an average detector which are oppositely sensed; means for applying the alternating current signal to the inputs of said detectors; an integrator having its input terminal connected through signal paths to the output terminals of the detectors; a pair of voltage controllable switches the first of which, when closed, applies an earth connection to a point in one of said paths and the second of which, when closed, applies an earth connection to a point in the other of said paths; a comparator having one input terminal earthed and the other input terminal connected to the output terminal of said integrator; two AND gates each having one input terminal fed through an inverter with the timing wave form, one of said AND gates providing a width modulated pulsed output wave form and having its second input terminal fed through another inverter with output from the comparator and the other of said AND gates having its second input connected directly to the output terminal of the comparator; means for applying the timing wave form to close the first switch during alternate half waves; and means for utilizing the changes in output from said other AND gate to cause the second switch to open at the commencement of each of the remaining half-waves of the timing wave form and re-close at a time during said remaining half-wave which is determined by the output from the comparator.

Preferably the switches are voltage controllable electronic switches, e.g. voltage controlled diodes or transistors.

The invention is illustrated in and further explained in connection with the accompanying drawings in which FIG. 1 is a block diagram of one embodiment and FIGS. 2 to 6 are explanatory wave forms relating to the operation of the device represented in FIG. 1.

Referring to FIG. 1 the signal whose peak to average rating is to be measured is applied from terminal 1 to two detectors 2 and 3 of which 2 is a peak detector and 3 is an average detector. These detectors may take any suitable convenient forms known per se. They are indicated as of the diode type. It will be noted that they are oppositely sensed, i.e. the diode in one detector is connected in the opposite sense to that of the other, 2 providing a positive output and 3 a negative one.

The output terminals of the detectors are connected through resistances 4, 5 to the input of an integrating circuit 6 of any suitable known form. Voltage operated normally closed switches 7, 6, when closed (i.e. when not operated) connect the mid-points of the resistances 4, 5 to earth. For simplicity of drawing these switches are shown as electro-mechanical relay switches but in preferred practice they would be electronic switches as known per se, e.g. constituted by voltage controlled diodes or transistors. The control of these switches will be described later herein.

The output terminal of the integrator 6 is connected to one input terminal 9 of a comparator 10 the other input terminal 11 of which is earthed. The output terminal of comparator 10 is connected through an inverter 12 to one input terminal 13 of an AND gate 14 and is also directly connected to one input terminal 15 of another AND gate 16.

A timing wave form is applied from terminal 17 to operate the switch 7 so that said switch is open during positive half-waves and closed during negative ones. This wave form is also applied through a second inverter 18 to the remaining input terminals 19 and 20 of the AND gates 14 and 16, the former of which supplies the output of the whole device to an output terminal 21 and the latter of which operates the switch 8.

The operation of the device of FIG. 1 will now be explained with reference to FIGS. 2 to 6 inclusive.

Figure 2:
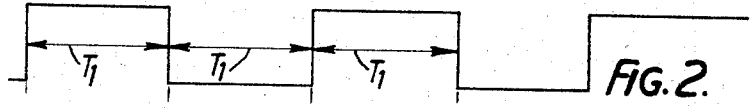
Figure 3:
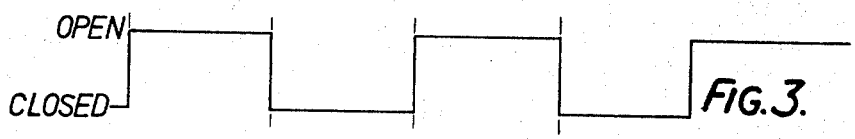

FIG. 2 shows the timing wave form which is applied at terminal 17. It is, as will be seen, a symmetrical rectangular wave form with positive and negative half-waves each of duration $T_1$ the timing wave form period being thus $2T_1$. As already stated, the switch 7 is open during positive half-waves of the time wave form and closed during negative half-waves. The operation of switch 7 is shown in conventional manner in FIG. 3. When switch 7 is open a positive input will be applied to the integrator 6 which will accordingly provide a negative output at the terminal 9 of the comparator 10. The output from said comparator will therefore be positive and this is applied directly to the input terminal 15 of the AND gate 16 and, after reversal by the inverter 12, is applied as a negative input to terminal 13 of AND gate 14. At this time (i.e. during positive timing half-waves) the second input terminal 15 of AND gate 16 receives a negative input from the inverter 18 and accordingly it provides no output; the switch 8 remains closed; and the input to the second input terminal 19 of AND gate 14 is negative, being also supplied from the inverter 18.

At the end of the positive timing half-wave switch 7 closes. However, for the time being the output from integrator 6 remains negative but the output from the inverter 18 changes polarity. AND gate 14 remains unchanged but AND gate 16 has now two positive inputs and accordingly the switch 8 opens. In this condition (switch 7 closed and switch 8 open), output from the average detector is fed to the integrator 6 the output from which becomes progressively less negative. When it reaches zero volts the output from comparator 2 reverses (it becomes zero) and, in consequence, AND gate 14 provides an output to the terminal 21 and AND gate 16 ceases to provide an output so that switch 8 closes. The opening and closing of switch 8 is shown conventionally by FIG. 5. It is open for a time $T_2$ which commences each time the timing wave form goes negative and terminates each time the output from the integrator reaches zero. The whole cycle of operations recommences when the timing wave form next goes positive.

Figure 4:
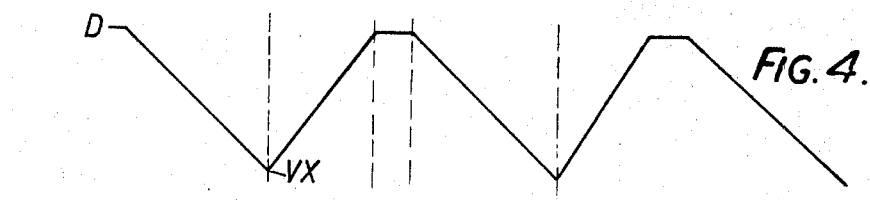
Figure 5:
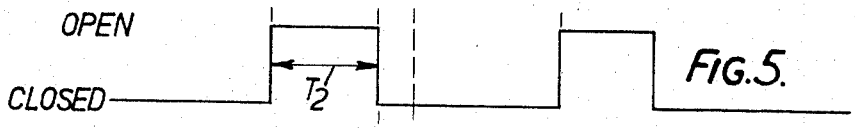
Figure 6:
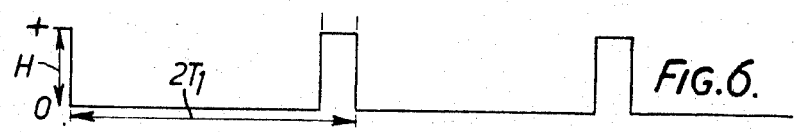

FIG. 4 shows a typical wave of voltage variation at the output from the integrator 6 while FIG. 6 shows a typical output pulsed wave form at the terminal 21.

As will now be understood, the output from the peak detector 2 is fed to the integrator 6 during positive half waves of the timing wave form. It may be shown that, at the end of each such half-wave, the voltage at the output terminal of the integrator will be:

$$V_p T_1/RC$$

where $V_p$ is the output voltage of the peak detector 2 and $RC$ is the time constant of the integrator.

During the time $T_2$ in which switch 8 is open, the output from the average detector 3 is fed to the integrator. The end of this time $T_2$ occurs when the output voltage from the integrator has risen to zero. It may be shown that, at this moment:

$$V_p T_1/RC = V_a T_2/RC$$

where $V_a$ is the output voltage from the average detector 3.

It therefore follows that $$V_p/V_a = T_2/T_1$$

If H is the amplitude of the pulsed wave form from the AND gate 14 and $V_o$ is the average value of said wave form it may be shown that $$V_o = (H/2)(V_{p}/V_a) - 1$$

This is of the same form as the equation hereinbefore given for the peak to average rating (P.A.R.). Therefore, by suitably choosing the value of H, it is possible, by means of an ordinary average reading meter (not shown) connected to terminal 21, to indicate the value of P.A.R. The meter may be calibrated to read P.A.R. directly and may have a linear scale. Zero deflection of the meter will correspond with 100 percent P.A.R. value.

I claim:

1. A method of measuring the ratio of the peak value to the average value of an alternating current signal, said method including the steps of deriving from said signal voltages respectively representative of the peak and average values of said signal, integrating one of said voltages over alternative half-waves of a periodic timing waveform, integrating the other of said voltages during periods which alternate with said half-waves and are of lengths determined by the relation between the two integrated derived voltages, and producing an output pulsed waveform the average value of which is representative of the relation between the lengths of said periods and the duration of a half-wave of the timing waveform.

2. A method as claimed in claim 1 wherein the two derived voltages are applied in turn to a common integrator, the switching of one of said voltages being controlled by the timing waveform so that said voltage is fed to said integrator for alternate half-waves of the timing waveform, and the switching of the other of said voltages being jointly controlled by said timing waveform and a comparator connected to receive output from the integrator.

3. A method as claimed in claim 2 wherein the output pulsed waveform is a waveform of modulated pulse width produced under joint control by the timing waveform and the output from the comparator.

4. A device for measuring the ratio of the peak value to the average value of an alternating current signal, said device comprising a peak value detector and an average value detector fed with said signal; a timing waveform source; means for integrating output from one of the detectors during alternate half-waves of the timing waveform; means for integrating output from the other of said detectors during periods which alternate with said half-waves and are of lengths determined by the relation between the outputs from the detectors; and means for deriving from the timing waveform a pulsed output waveform of pulse width modulated in dependence upon the relation between said periods and the length of a half-wave of the timing waveform.

5. A device as claimed in claim 4 wherein the outputs from the detectors are integrated by a common integrator to which said outputs are fed in turn under the control of switching means.

6. A device as claimed in claim 5 wherein the output from the common integrator is fed to one input of a comparator the other input of which is earthed, said comparator being adapted to reverse its output and become zero when the integrated input thereto becomes zero; the timing waveform is applied to control a first switch to cause the output from the peak detector to be applied to the common integrator during alternate half-waves from the timing waveform source; and there are provided two gate circuit devices both jointly controlled by output derived from the comparator and by a waveform derived from the timing waveform source, one of said gate circuit devices providing an output controlling a second switch to cause output from the average detector to be applied to the integrator for a time each of which commences at the end of one of said alternate half-waves of the timing waveform and terminates when the aforesaid input to the integrator next reaches zero and the other of which provides a pulsed output waveform each pulse in which commences at a time of termination of the application of output from the average detector to the integrator and terminates at the time of commencement of the next following half-wave of the timing waveform.

7. A device in accordance with claim 4 and comprising a peak detector and an average detector which are oppositely sensed; means for applying the alternating current signal to the inputs of said detectors; an integrator having its input terminal connected through signal paths to the output terminals of the detectors; a pair of voltage controllable switches the first of which, when closed, applies an earth connection to a point in one of said paths and the second of which when closed applies an earth connection to a point in the other of said paths; a comparator having one input terminal earthed and the other input terminal connected to the output terminal of said integrator; two AND gates each having one input terminal fed through an inverter with the timing waveform, one of said AND gates providing a width modulated pulsed output waveform and having its second input terminal fed through another inverter with output from the comparator and the other of said AND gates having its second input connected directly to the output terminal of the comparator; means for applying the timing waveform to close the first switch during alternate half-waves; and means for utilizing the changes in output from said other AND gate to cause the second switch to open at the commencement of each of the remaining half-waves of the timing waveform and re-close at a time during said remaining half-wave which is determined by the output from the comparator.

8. A device as claimed in claim 4 wherein the switches are voltage controllable electronic switches.

* * * * *

UNITED STATES PATENT OFFICE
CERTIFICATE OF CORRECTION

Patent No. 3,710,253      Dated January 9, 1973

Inventor(s) DAMER EVELYN O'NEILL WADDINGTON

It is certified that error appears in the above-identified patent and that said Letters Patent are hereby corrected as shown below:

On the cover sheet [19], "O'Neill" should read -- Waddington -- . On the cover sheet [75], "Damer Evelyn O'Neill, Waddington," should read -- Damer Evelyn O'Neill Waddington -- .

Signed and sealed this 20th day of November 1973.

(SEAL)
Attest:

EDWARD M. FLETCHER, JR.      RENE D. TEGTMEYER
Attesting Officer             Acting Commissioner of Patents

UNITED STATES PATENT OFFICE
CERTIFICATE OF CORRECTION

Patent No. 3,710,253      Dated January 9, 1973

Inventor(s) Damer Evelyn O'Neill Waddington

It is certified that error appears in the above-identified patent and that said Letters Patent are hereby corrected as shown below:

In the heading, following "United States Patent", "O'Neill" should be --Waddington--; and after "Inventor" "Damer Evelyn O'Neill, Waddington," should read --Damer Evelyn O'Neill Waddington,--.

Signed and sealed this 20th day of August 1974.

(SEAL)
Attest:

McCOY M. GIBSON, JR.
Attesting Officer

C. MARSHALL DANN
Commissioner of Patents